United States Patent [19]

Sander et al.

[11] 4,138,269
[45] Feb. 6, 1979

[54] CONVERSION OF VISCOUS, REACTIVE CHLORINE- AND SULFUR-CONTAINING PRODUCTION RESIDUES INTO SOLID PRODUCTS WHICH CAN BE DUMPED

[75] Inventors: Bruno Sander, Ludwigshafen; Albrecht Mueller, Frankenthal; Hans Merkle; Gerhard Janisch, both of Ludwigshafen, all of Fed. Rep. of Germany

[73] Assignee: BASF Aktiengesellschaft, Ludwigshafen, Fed. Rep. of Germany

[21] Appl. No.: 820,719

[22] Filed: Aug. 1, 1977

[30] Foreign Application Priority Data

Aug. 25, 1976 [DE] Fed. Rep. of Germany ....... 2638224

[51] Int. Cl.$^2$ .............................................. C04B 7/02
[52] U.S. Cl. .......................................... 106/90; 106/96; 106/105; 106/106; 106/118
[58] Field of Search ...................... 106/89, 90, 91, 92, 106/96, 105, 106, 118

[56] References Cited

U.S. PATENT DOCUMENTS

| 764,250 | 7/1904 | Mielck | 106/106 |
|---|---|---|---|
| 3,947,283 | 3/1976 | Uchikawa et al. | 106/89 |
| 3,947,284 | 3/1976 | Kitsugi et al. | 106/89 |
| 4,028,130 | 6/1977 | Webster et al. | 106/118 |
| 4,049,462 | 9/1977 | Cocozza | 106/118 |

*Primary Examiner*—L. Dewayne Rutledge
*Assistant Examiner*—John P. Sheehan
*Attorney, Agent, or Firm*—Keil & Witherspoon

[57] ABSTRACT

A process for converting viscous reactive chlorine- and sulfur-containing production residues into solid products which can be dumped, wherein the said residues are treated with alkaline materials. In a preferred embodiment of the invention, chlorine-containing and sulfur-containing production residues which are viscous and still reactive, e.g. the residues obtained from the manufacture of plant protection agents, dyes or fine chemicals, are converted in a simple and efficient manner into solid products which can be dumped. The treatment according to the invention has the advantage that no further pollution of the environment by waste gases or waste water results.

4 Claims, No Drawings

CONVERSION OF VISCOUS, REACTIVE CHLORINE- AND SULFUR-CONTAINING PRODUCTION RESIDUES INTO SOLID PRODUCTS WHICH CAN BE DUMPED

The present invention relates to a process for converting chlorine-containing and sulfur-containing production residues, which are viscous and still reactive, into solid products which can be dumped, by treating the residues with alkaline materials and small amounts of water.

The manufacture of, for example, plant protection agents, dyes or fine chemicals at times gives chlorine-containing and/or sulfur-containing production residues which are viscous and still reactive. On contact with water, for example atmospheric moisture, uncontrollable vigorous reactions may occur. The residues evolve acid vapors such as hydrogen chloride and sulfur dioxide, which are toxic and cause corrosion.

It is known that such production residues can be disposed of by combustion. However, this also produces acid waste gases, e.g. hydrogen chloride, chlorine, sulfur dioxide, sulfur trioxide and hydrogen sulfide, which in part have the same undesirable properties. For this reason, the combustion unit must be of corrosion-resistant construction and must have a downstream waste gas purification step. For this, the hot waste gases must be cooled, in a waste gas quench unit downstream from the combustion chamber, to from 80 to 300° C. This part of the installation is subject to special hazards because of these extreme temperature differences.

The purification of the waste gas to remove hydrogen chloride and sulfur trioxide is effected by washing with water, whilst for chlorine and sulfur dioxide special wash liquors are required.

Dry waste gas purification processes, e.g. adsorption on active charcoal, are very expensive. Processes in which acid constituents are neutralized by spraying milk of lime or lime powder into the combustion chambers are disadvantageous because the process is difficult to carry out and deposits and crusts form in the combustion unit.

Another conventional method of waste disposal is to deposit the production residues in an underground dump. Because of the danger of toxic and corrosive gas mixtures being given off, this type of waste disposal presents problems and is, therefore, only authorized officially in special cases.

Finally, it has been disclosed that production residues of the above type can be neutralized by treatment with aqueous alkalis, e.g. sodium hydroxide solution or calcium hydroxide solution. However, the water-insoluble residues thus formed are difficult to separate off because of their bulky and slimy nature. The filtrates obtained again contain toxic materials, so that a new waste water problem is created.

It is an object of the present invention to convert the viscous, reactive, chlorine- and sulfur-containing production residues in as simple and efficient a manner as possible into solid products which can be dumped, in such a way that further pollution of the environment by waste gases or waste water is impossible.

We have found that this object is achieved and that viscous, reactive, chlorine- and sulfur-containing production residues can, whilst avoiding the above disadvantages and difficulties, be converted into products which can be dumped, by treatment with alkaline materials, if the viscous residues are premixed with dry, pulverulent and absorbent alkaline materials, the amount of the latter being so chosen that a homogeneous, solid or pasty mixture is produced, and the mixed product obtained then has added to it an amount of water such that after reaction with the latter a solid, free-flowing product is obtained.

Cement, quicklime, limestone, dolomite, ash, sewage sludge ash or mixtures of these materials may be used as dry, pulverulent and absorbent alkaline materials.

The amount of the alkaline materials to be used is such that the ratio of these materials to the production residues is from 0.5:1 to 2:1.

The amount of water which is added to the homogeneous mixed product of the production residue and alkaline materials is in general from 1 to 60 and preferably from 20 to 40 parts of water, based on 100 parts of production residue homogeneously distributed in the mixed product.

To carry out the process of the invention, the viscous, reactive, chlorine- and sulfur-containing production residues (hereinafter referred to simply as production residue) are advantageously used at from 40 to 80° C, so that the viscous material can be conveyed and metered. In most cases, the production residues as obtained are already at a temperature within the said range, so that they can be treated directly. If the production residue is at a lower temperature, it may become necessary to heat it in a stirred vessel equipped with jacket heating.

The mixing of the production residue with the alkaline materials, and the subsequent reaction with water, may be carried out in stirred vessels, mixers or kneaders, e.g. in a bowl kneader. It is possible to introduce a certain amount of the alkaline pulverulent materials into these devices and then to introduce the production residue whilst stirring, mixing or kneading. The stirring, mixing or kneading is advantageously continued until a homogeneous, pulverulent or pasty mixed product has formed. Water is then added until there is no further rise in temperature of the mixture and the material has reacted completely.

It is advantageous to use stirred vessels, mixing vessels and kneaders of double-walled construction so that they can be heated or cooled, depending on the particular object, during the reaction with water. If the exothermic reaction with water generates volatile products which can be isolated and re-used economically, the mixture is additionally heated in order to achieve substantially complete removal of the volatile constituents. If, on the other hand, it is not intended to isolate and re-use products of value, the heat of reaction generated is removed by a cooling medium so that the reaction with water produces only very small amounts of volatile substances.

The isolation and removal of the volatile constituents produced in the reaction with water is advantageously effected by condensation in a descending condenser. The residual waste gas can, as a safety precaution, be passed through an acid or alkaline waste gas wash. Following this after-treatment, the waste gas is free from chlorine- and sulfur-containing constituents.

In an advantageous embodiment, the mixing of the components and the reaction with water is carried out continuously in a kneader. In particular, single-screw or twin screw mixing and kneading extruders may be used for this purpose. These extruders are first charged with the alkaline pulverulent material. The production residue is then introduced. The components are very intimately mixed by the mixing and feed screws of the kneader. Finally, water is added about half way along the screw. Above the second part of the screw (in the output direction) there is a devolatilization dome, through which the volatile constituents can escape or are drawn off. Finally, the kneader discharges a solid, freeflowing product.

The most advantageous embodiment for treating a particular production residue can be established by a simple preliminary experiment, e.g. by trituration in a mortar or by mixing in a porcelain dish. These experiments serve to establish which of the stated alkaline materials can be used most advantageously in each particular case, what amount is needed and how much water must be added to give a free-flowing solid product which has reacted fully.

The products obtained by the process of the invention are solid and free-flowing, and have bulk densities of from 750 to 950 g/l, so that they can be transported economically and be safely deposited on a dump.

When using cement, sewage sludge ash or mixtures of alkaline materials which contain cement or sewage sludge ash, the products are obtained without fines, i.e. in a non-dusting form.

The pH of the free-flowing solid products is from 7.5 to 13.0, measured by the method of DIN 53,200.

The treatment according to the invention converts the production residues, which are mostly water-soluble, into secondary products which are less soluble or even insoluble in water. The residual solubility is in general only from 1 to 5 percent by weight, based on the product.

To determine the toxicity of the aqueous extracts obtained from the treated production residues. The TTC test (see Deutsche Einheitsverfahren zur Wasser-, Abwasser- und Schlamm-Untersuchung, 3rd edition, system No. L 3, Verlag Chemie GmbH, Weinheim/Bergstrasse) was used. In this, the inhibiting action on dehydrogenase activity is determined by a color reaction using 2,3,5-triphenyltetrazolium chloride (TTC). The production residues have toxicity values (inhibition values) of from $-20$ to $-40$, whilst the treated samples prove indifferent (toxicity value: $\pm 0$).

In the Examples which follow, parts and percentages are by weight.

EXAMPLES

In Examples 1 to 9, a viscous chlorine- and sulfur-containing production residue (A), obtained from the manufacture of a plant protection agent, is employed.

The residue is dark brown and viscous and has an unpleasant pungent odor. It reacts vigorously with water to form hydrogen chloride and sulfur dioxide. After the reaction with water, the material is virtually completely soluble in water. The pH of the production residue is 0.2. On heating to 150° C, a vigorous decomposition occurs, with formation of acid gases and nitrogen. The TTC test gives a toxicity value of $-20$.

EXAMPLES 1 to 4

In each case, 200 parts of the production residue (A) described above, which was heated to 60° C to facilitate its handling, and 200 parts of the alkaline materials shown in Table 1 are thoroughly mixed in a porcelain dish by means of a wooden spatula. After about 2 minutes, a solid to pasty mass is formed. 80 parts of water are then added to the homogeneous mixed product whilst kneading it vigorously with a wooden spatula. A vigorous reaction occurs and the temperature of the mass rises to 110° C., gas being evolved. The properties of the reaction products obtained are shown in Table 1.

The tabulated results of Examples 1 to 4 show that the strongly acid viscous production residue (A) has been converted into non-toxic free-flowing solid products which can be deposited on a dump.

TABLE 1

| Example | Alkaline material | Residue Appearance | Amount (g) | Yield of solids (%) | Bulk density (g/l) | pH | Solubility in water g/100 ml | TTC test toxicity values |
|---|---|---|---|---|---|---|---|---|
| 1 | Cement | brown solid particles, non-dusting | 463.2 | 96.5 | 825 | 9.9 | 4.5 | ± 0 |
| 2 | Burnt lime | yellowish brown powder, dusts | 459.4 | 95.7 | 785 | 12.3 | 3.9 | ± 0 |
| 3 | Dolomite | brown solid particles, non-dusting | 423.4 | 88.2 | 762 | 7.6 | 7.1 | ± 0 |
| 4 | Sewage sludge ash | brown solid particles, non-dusting | 461.3 | 96.1 | 820 | 7.9 | 4.4 | ± 10 |

EXAMPLES 5 to 8

200 parts of the alkaline materials listed in Table 2 are charged into a laboratory kneader having a useful volume of 1 liter, a drive power of 0.3 kW and a speed of 33 rpm. 200 parts of the production residue (A) which has been heated to 60° C., i.e. the material used in Experiments 1 to 4, are then introduced into the alkaline pulverulent substance which is being agitated by the kneading blades. After kneading for two minutes, a solid to pasty mixed product is formed. 80 parts of water are then sprayed onto this product, causing the reaction to go to completion, with evolution of heat and gas. The heat of reaction is substantially removed, through the wall of the kneader, by means of cooling water. The maximum measured temperature of the mixed product was 90° C.

The properties of the reaction products obtained are shown in Table 2.

The experiments in the laboratory kneader again show that non-toxic, free-flowing solid products are obtained.

TABLE 2

| Example | Alkaline material | Residue Appearance | Amount (g) | Yield of solids (%) | Bulk density (g/l) | pH | Solubility in water g/100 ml | TTC test toxicity values |
|---|---|---|---|---|---|---|---|---|
| 5 | Cement | brown solid particles, non-dusting | 467.3 | 97.4 | 820 | 9.9 | 4.6 | ± 0 |

TABLE 2-continued

| Example | Alkaline material | Residue Appearance | Amount (g) | Yield of solids (%) | Bulk density (g/l) | pH | Solubility in water g/100 ml | TTC test toxicity values |
|---|---|---|---|---|---|---|---|---|
| 6 | Burnt lime | yellowish brown powder, dusts | 460.1 | 95.9 | 795 | 12.2 | 3.8 | ± 0 |
| 7 | 160 parts of cement + 40 parts of burnt lime | brown solid particles, non-dusting | 465.4 | 97.0 | 801 | 11.5 | 2.9 | ± 0 |
| 8 | 160 parts of cement + 40 parts of sewage sludge ash | brown solid particles, non-dusting | 468.0 | 97.5 | 856 | 7.9 | 4.3 | ± 0 |

EXAMPLE 9

200 parts of the production residue (A) used in Experiments 1 to 8 were intimately mixed with 200 parts of cement in a porcelain dish. The mixed product obtained was filled into a distillation flask equipped with a stirrer and 100 parts of water were added whilst stirring, causing the temperature to rise to 130° C. The mixture was then heated for a further 30 minutes, until the mixed product was at 180° C. The volatile constituents were condensed in a descending condenser and collected in a receiver. After passing through a wash bottle containing sodium hydroxide solution, the waste gas was discharged into the atmosphere.

447.5 parts of a brown, free-flowing and non-dusting distillation residue were obtained. The total yield was 89.5 percent.

Properties of the treated production residue:

| Bulk density | (g/l) | 890 |
|---|---|---|
| pH | | 9.5 |
| solubility in water | (g/100 ml) | 2.7 |
| TTC test, toxicity value | | ± 0 |

In addition, 34 parts of distillate (6.8% of the total batch), giving an alkaline reaction, were obtained. Fractional distillation thereof gave 18 parts of isopropylamine ($n_D^{20}$: 1.3768; boiling point/760 mm Hg: 33–34° C).

The waste gas which escaped was free from chlorine- and sulfur-containing constituents.

In the Example which follows, an alkaline production residue (B), obtained from the manufacture of a plant protection agent, was used. The residue is black, very viscous, has an intense smell of amines and a pH of 8.7, and also contains chlorine- and sulfur-containing constituents. In addition, it contains toxic metals, e.g. nickel and chromium, namely 1.5 g of nickel and 4.6 g of chromium per kg of production residue. The toxicty value in the TTC test was −30.

EXAMPLE 10

200 parts of the production residue (B) described above are mixed with 300 parts of burnt lime as described in Examples 1 to 4 and 95 parts of water are added.

The reaction with water is exothermic and the temperature of the mass rises to 100° C.

576 parts of an ochre, solid, free-flowing and non-dusting product were obtained. The total yield was 96.8 percent.

Properties of the treated production residue:

| Bulk density | (g/l) | 760 |
|---|---|---|
| pH | | 12.6 |
| Solubility in water | (g/100 ml) | 2.2 |
| TTC test, toxicity value | | ± 0 |

In the aqueous extract of the treated production residue, the toxic metals nickel and chromium were only detectable in a concentration of less than 1 ppm.

We claim:

1. A process for converting viscous, reactive, chlorine- and sulfur-containing production residues into products which can be dumped, by treatment with alkaline materials, which comprises mixing in the absence of added water a dry, pulverulent, absorbent, alkaline solid and a reactive, viscous chlorine- and sulfur-containing production residue which reacts vigorously with water and evolves toxic and corrosive vapors, the proportions of said alkaline solid and said residue being such that a pulverulent solid to pasty mixture is formed, and adding to said solid or pasty mixture an amount of water in the range of 1 to 60 parts of water per 100 parts of said production residue and sufficient to produce, after an exothermic reaction of said mixture with said water with evolution of gases and vapors produced in the exothermic reaction, a solid free-flowing product ready for disposal as a non-toxic composition.

2. A proces as claimed in claim 1, wherein cement, quicklime, limestone, dolomite, ash, sewage sludge ash or mixtures of these materials are used as the dry, pulverulent and absorbent solid.

3. A process as claimed in claim 1, wherein the weight ratio of the amount of alkaline solid to the amount of production residue is from 0.5:1 to 2:1.

4. A process as claimed in claim 1, wherein from 20 to 40 parts of water are added per 100 parts of production residue.

* * * * *